United States Patent
Floyd et al.

(10) Patent No.: US 8,112,250 B2
(45) Date of Patent: Feb. 7, 2012

(54) PROCESSOR POWER MANAGEMENT

(75) Inventors: Michael S. Floyd, Cedar Park, TX (US); Karthick Rajamani, Austin, TX (US); Freeman L. Rawson, III, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 12/263,597

(22) Filed: Nov. 3, 2008

(65) Prior Publication Data

US 2010/0115343 A1 May 6, 2010

(51) Int. Cl.
*G06F 19/00* (2011.01)
(52) U.S. Cl. .................................................. 702/182
(58) Field of Classification Search ........... 702/182–185
See application file for complete search history.

(56) References Cited

U.S. PATENT DOCUMENTS

| 5,623,647 A | 4/1997 | Maitra |
| 5,719,800 A | 2/1998 | Mittal et al. |
| 2007/0245165 A1 * | 10/2007 | Fung .............................. 713/320 |

* cited by examiner

*Primary Examiner* — Edward Raymond
(74) *Attorney, Agent, or Firm* — DeLizio Gilliam, PLLC

(57) ABSTRACT

Semiconductor device circuits and methods are provided for adjusting core processor performance and energy-efficiency based on usage metrics. Metric detection, performance state selection, and adjustment are done in digital logic hardware without intervening input from system software or firmware, thus greatly speeding the processor performance adjustment. Mapping usage and state information to desired processor power-performance states is also provided in circuitry rather than firmware or power control software. The mapping values may be programmable software or firmware, but detection, selection, and adjustment occur automatically in hardware without intervening input from firmware or software.

20 Claims, 8 Drawing Sheets

SET A
POWER PERFORMANCE STATE MAPPING DATA

| Usage Condition 1 | Power-Performance State 1 |
|---|---|
| Usage Condition 2 | Power-Performance State 2 |
| Usage Condition 3 | Power-Performance State 3 |
| Usage Condition 4 | Power-Performance State 4 |

502

SET B
POWER PERFORMANCE STATE MAPPING DATA

| Usage Condition 1 | Power-Performance State 1 |
|---|---|
| Usage Condition 2 | Power-Performance State 2 |
| Usage Condition 3 | Power-Performance State 3 |
| Usage Condition 4 | Power-Performance State 4 |

PROCESSOR POWER MANAGEMENT

STATEMENT REGARDING FEDERALLY SPONSORED RESEARCH OR DEVELOPMENT

This invention was made with Government support under PERCS Phase III, HR00110790002. THE GOVERNMENT HAS CERTAIN RIGHTS IN THIS INVENTION.

TECHNICAL FIELD OF THE INVENTION

This invention relates to improving energy efficiency in microprocessors, and more specifically to circuitry on board the microprocessor integrated circuit for controlling energy efficiency.

BACKGROUND OF THE INVENTION

Processors in computers employ variable power-performance states to match operating states to compute load. Modern processors incorporate dynamic voltage and frequency scaling as integral mechanisms to tailor operating states. These operating state changes are typically managed by the operating system or system firmware using explicit, special instructions to cause processor operating state change. Management of these states by the system software layer is typically designed to take a conservative approach, and therefore limits the benefits that can be extracted using the state change mechanisms.

Some modern processors have hardware mechanisms for automatically demoting a software managed idle state transition for greater power reduction. However, even in such a case, the system software/firmware has to first initiate the transition to idle state before hardware can apply the voltage/frequency scaling. System software is typically unaware of the fine-grain variations in workload characteristics that rapidly alter the performance-level required from the hardware. The system software is therefore unable to adapt to the workload in a rapid fashion. In today's systems, power-performance state control is, hence, conservatively employed giving up greater efficiency.

SUMMARY OF THE INVENTION

During low IPC (instructions per cycle) and/or low activity, a CPU (central processing unit) core is rapidly adjusted to a lower power-performance state to conserve energy through a hardware-only solution built into the CPU semiconductor device. The adjustment is made by a fast-adjust control loop operating independently of the CPU core instruction stream. This adjustment may include dropping frequency, voltage, or other power-performance characteristics. While current solutions require either the operating system or system firmware to identify when lower power-performance states are tolerable and issue the transition command, the preferred embodiments herein have no such requirement. Core usage is monitored and usage-level metrics are calculated in hardware. Using the usage-level metrics, selection logic selects among possible power-performance states. A fast actuator is present in each system core to rapidly adjust the core power-performance state based on the selection.

One embodiment is an integrated circuit device including a processor core and core monitoring circuitry that indicates certain usage-level metrics of the processor core. Other metric values may be calculated in digital logic based on values provided by the core monitoring circuitry. The metrics are used by performance-state selection digital circuitry to select a desired performance state from among at least two possible desired performance states. Actuator circuitry adjusts the core power-performance state between at least a first and second level based on the selected state.

In preferred implementations, the integrated circuit device can adjust the core power-performance state within 10 microseconds after a usage sequence in which the processor core achieves an ongoing usage workload usage level corresponding to an adjustment. Some versions are even faster. In some versions, performance-state selection digital circuitry is operable to compare a core usage metric value to a low threshold metric value, and when the usage metric is below the threshold (or has another complimentary relationship depending on the metric used), produce a desired performance state output value associated with a lowered activity power performance state. Other versions use a more complicated mapping scheme to select among several states based on several different metrics. In some versions the ongoing usage-level metrics of the processor core include a metric indicative of a number of active cycles in a given number of total cycles. Another preferred metric is indicates a number of completed instructions in a given interval. The intervals, and other performance-state selection criteria, along with their target states, can be programmed from firmware. The circuitry can also be used to supplement existing software and firmware power-performance state control solutions.

Another implementation provides a method of improving the power efficiency of a processor, including monitoring a processor core to determine one or more selected ongoing usage-level metrics of the processor core. The method detects a particular change in the usage-level metrics. In response to detecting the change, a desired next core performance state is selected using core performance state selection circuitry. This selection preferably occurs in the performance state selection circuitry without receiving any data or control input from system software or firmware between detecting the change and selecting the desired next core performance state. After selecting the desired next core performance state, the method changes the performance state of the processor core using core performance actuator circuitry. This also happens without receiving any data or control input from system software or firmware between selecting the desired next core performance state and changing a performance state of the processor core.

The use of digital logic without software intervention, rather than software or firmware-based solutions, can provide many advantages. The software solutions have only limited opportunities to examine metrics and initiate power-performance changes. Firmware performing the same task is also typically slow to respond. Real workloads can show much more fine-grained variation in frequency demands than the system software/firmware can react to. The preferred embodiments herein provide an automated hardware method for recognizing and acting upon opportunities for rapid state changes/scaling to match the fine-grained demands of workloads. This can improve the power-efficiency of the processor without sacrificing any performance, by matching the hardware operating state to the exact demands of the workload.

These and other advantages and features of the invention will be apparent from the following description of the preferred embodiments, considered along with the accompanying drawings.

BRIEF DESCRIPTION OF THE DRAWINGS

FIG. 5 shows two data structures with two different sets of power-performance state mappings.

DESCRIPTION OF PREFERRED EMBODIMENTS

Figure 1:
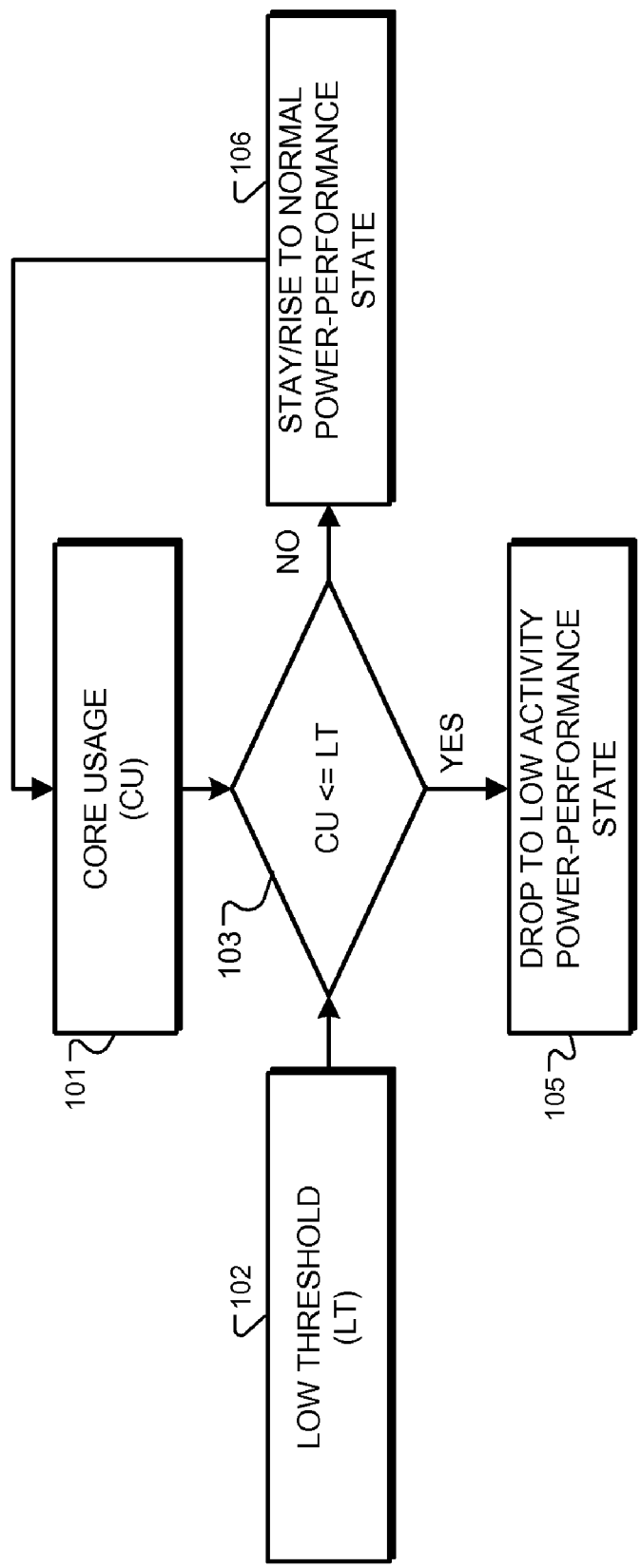
FIG. 1 shows a flowchart of a power-performance control scheme according to one embodiment.

FIG. 1 is a flowchart of a power-performance control scheme according to one embodiment. This version shows a simplified power-performance control scheme using a simple threshold level based on core usage. The depicted process takes place entirely in circuitry on a semiconductor device, without intervening operating system, software, or firmware steps involving instructions executed on the processor core on which power-performance is being controlled. At process block 101 a core usage metric is measured. The metric is further described below, but is preferably a quantity or ratio involving the number of instructions executed by the core on ongoing basis. Whatever metric is used, that value is input to the decision process block 103. At this step, the core usage (CU) is compared to a low threshold level (LT), which is shown as a configurable item at block 102. If the core usage metric is equal to or lower than the low threshold level, the process goes to the low activity power-performance state at block 105. Other implementations may of course use other comparisons such as comparing a metric that is the compliment of what is shown. That is, a metric lower than the threshold may cause a change to a lower power-performance state, but if the metric was a measure of inactivity, for lower than a threshold the system may move to a higher power-performance state. Whatever metric is used, when the threshold comparison provides a result appropriate for entering the low power-performance state, the system adjusts the power-performance state of the core to a lower power-performance state suitable for low processor core activity. If, at block 103, the core usage metric is higher than the low threshold, the process goes to block 106, where the power-performance state is either raised or maintained at the current level.

In one implementation, the circuit includes a timer to deactivate the low activity state at block 105 after a defined period to ensure the core is not left in the state unnecessarily. The calculation of performance metrics may also be different depending on whether the core is in the normal power-performance state or low power-performance state. That is, a first metric or metric scaling calculation may be used in the high power-performance state, and a second, more sensitive metric or metric scaling calculation may be used in a lower power-performance state to help ensure the core leaves the low power-performance state when needed.

Figure 2:
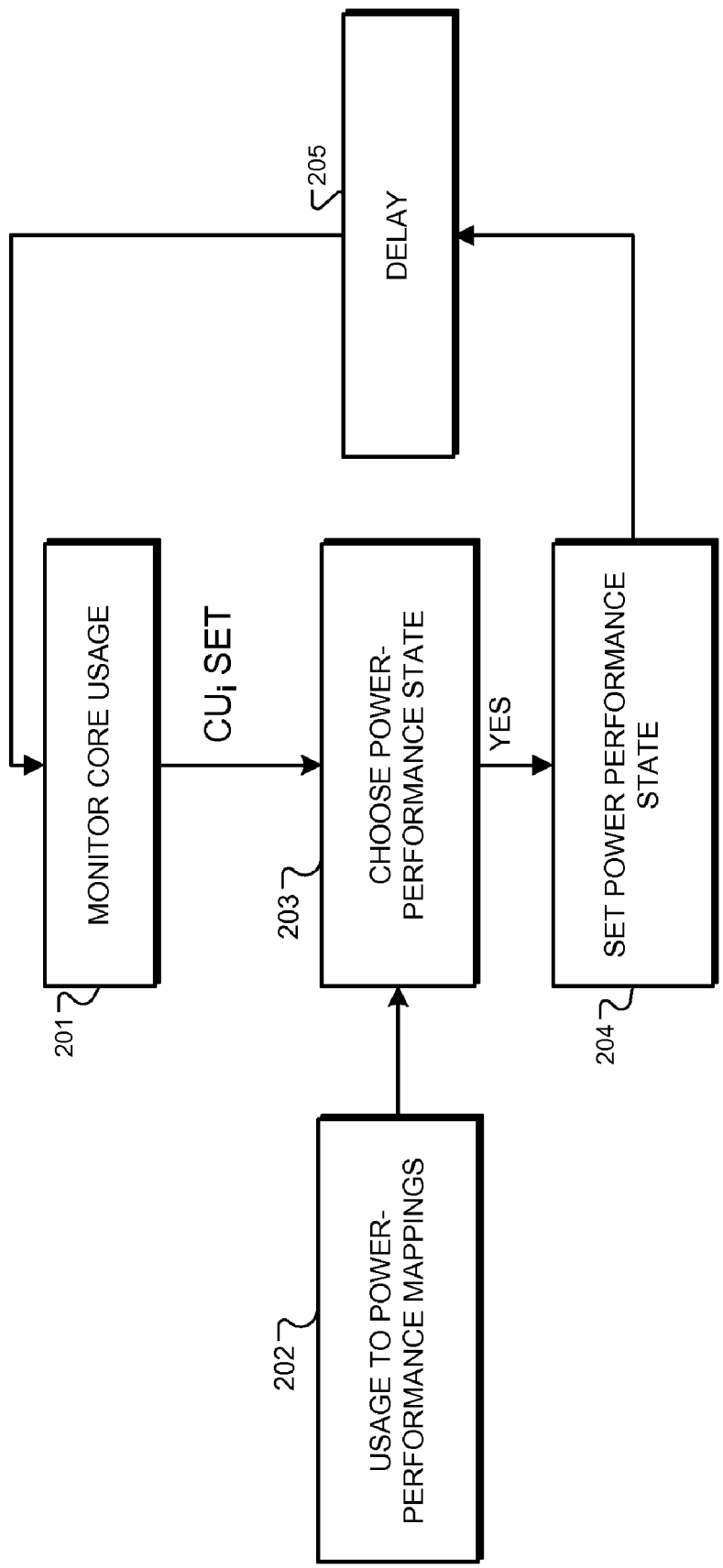
FIG. 2 shows a block diagram of a more complex implementation of a processor core power-performance scheme according to another embodiment.

FIG. 2 is a block diagram of a more complex implementation of a processor core power-performance scheme according to another embodiment. The depicted scheme also takes place in the semiconductor device circuitry without intervention from software or firmware. As used herein, when the process is set to take place without software or firmware intervention, this means that it is free from decisions, control, or calculations made by executable code running on the processor core on which the metrics are measured, or another microprocessor core in the same integrated circuit device.

As shown in FIG. 2, this process monitors core usage at process block 201. Output from this step is a set of core usage metrics labeled $CU_i$ SET. These core usage metrics may include simple rate measures such as 'number of active cycles in a given interval' or 'number of completed instructions in a given interval of X cycles'. The set may involve metric values that are calculated from simpler metrics that are counted in core processor monitoring digital logic. The calculation, however, takes place in circuitry external to the instruction stream of the processor core and is not performed by the processor core. As such, the process in 201 is a closed-loop operation in which the control loop does not interact with the instruction stream of the processor core, except for configuration settings. The $CU_i$ SET may further include other metrics, such as temperature and power consumption, that are converted from measured analog values.

The process block 201 monitors core usage to determine ongoing values for the core usage metric set $CU_i$ SET, and to detect a change in these metrics. The change may result in a corresponding change of the power and performance state. In response to detecting the change at block 201, a desired next core performance state is selected using core performance state selection circuitry at block 203. This selection preferably occurs in the performance state selection circuitry without receiving any data or control input from system software or firmware between detecting the change and selecting the desired next core performance state. After selecting the desired next core performance state, the method changes the power-performance state of the processor core using core performance actuator circuitry. This state change also happens without receiving any data or control input from system software or firmware between selecting the desired next core performance state and changing a performance state of the processor core.

To make the selection at block 203, rather than using a single threshold values in the previous version, the depicted system at process block 202 uses a group of core usage to power-performance mappings. The mappings at block 202 may define, for example, ranges of metric values which map to a corresponding desired power-performance state. The metrics and the compared-to thresholds are chosen such that they are appropriate at all power-performance states. By adjusting the processor core power-performance state outside of the processor core instruction stream, rather than using software and firmware executing on the core, the system provides rapid response capability to changes in workload characteristics at the 10's of microseconds timescale (as opposed to at best 10's of millisecond timescale in current solutions). Further, the system complements the actuation control logic used in software/firmware.

Figure 3:
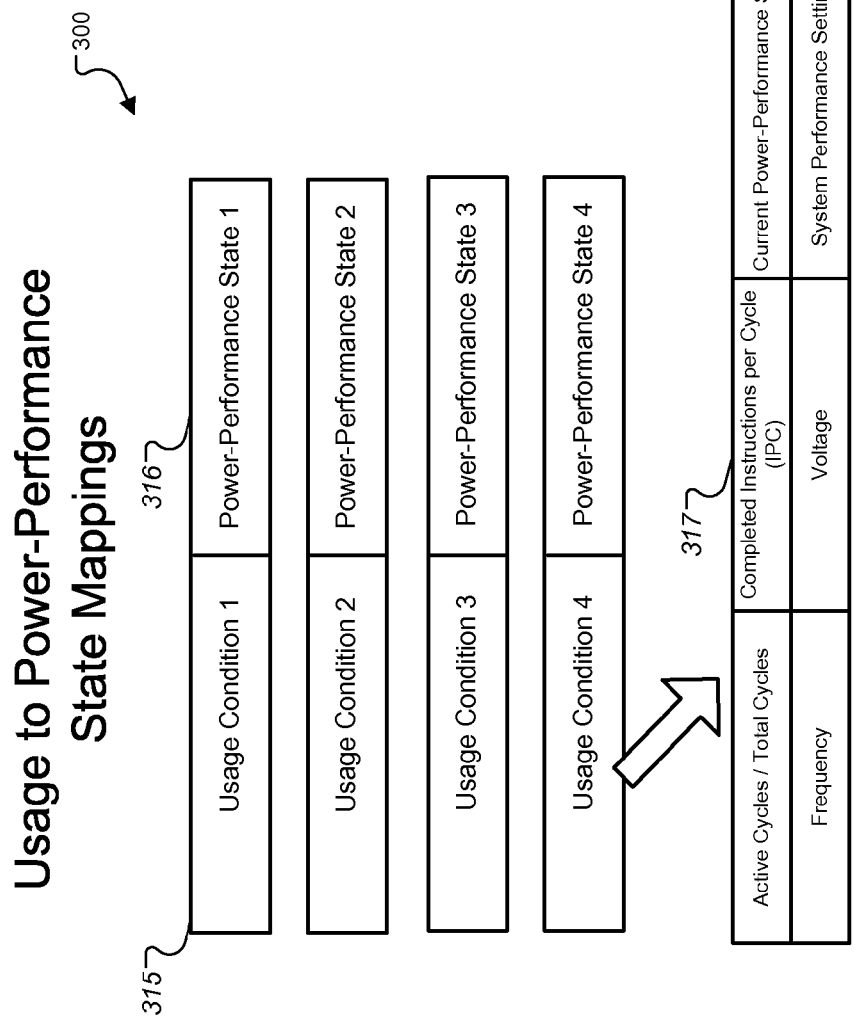
FIG. 3 shows a set of usage to power-performance state mappings according to one embodiment.

FIG. 3 shows a set of usage to power-performance state mappings according to one embodiment. The set 300 includes a number of mapping entries each including usage condition data 315 and power performance state data 316. The entries may appear as a data structure employed by the configuration software in some embodiments of the present invention, and subsequently they appear as register data values or other digital logic circuit memory values after being programmed into the selection circuitry used in various embodiments. In preferred embodiments, these entries are programmed into the digital logic power-performance state selection hardware and thereby control what power-performance states are selected during what usage conditions. While four entries are shown in FIG. 3, this is not limiting, and some systems have many more entries in a particular set of power-performance state mappings. Further, some embodiments use more than one set of mappings 300 under different conditions, as will be further described below.

Figure 4:
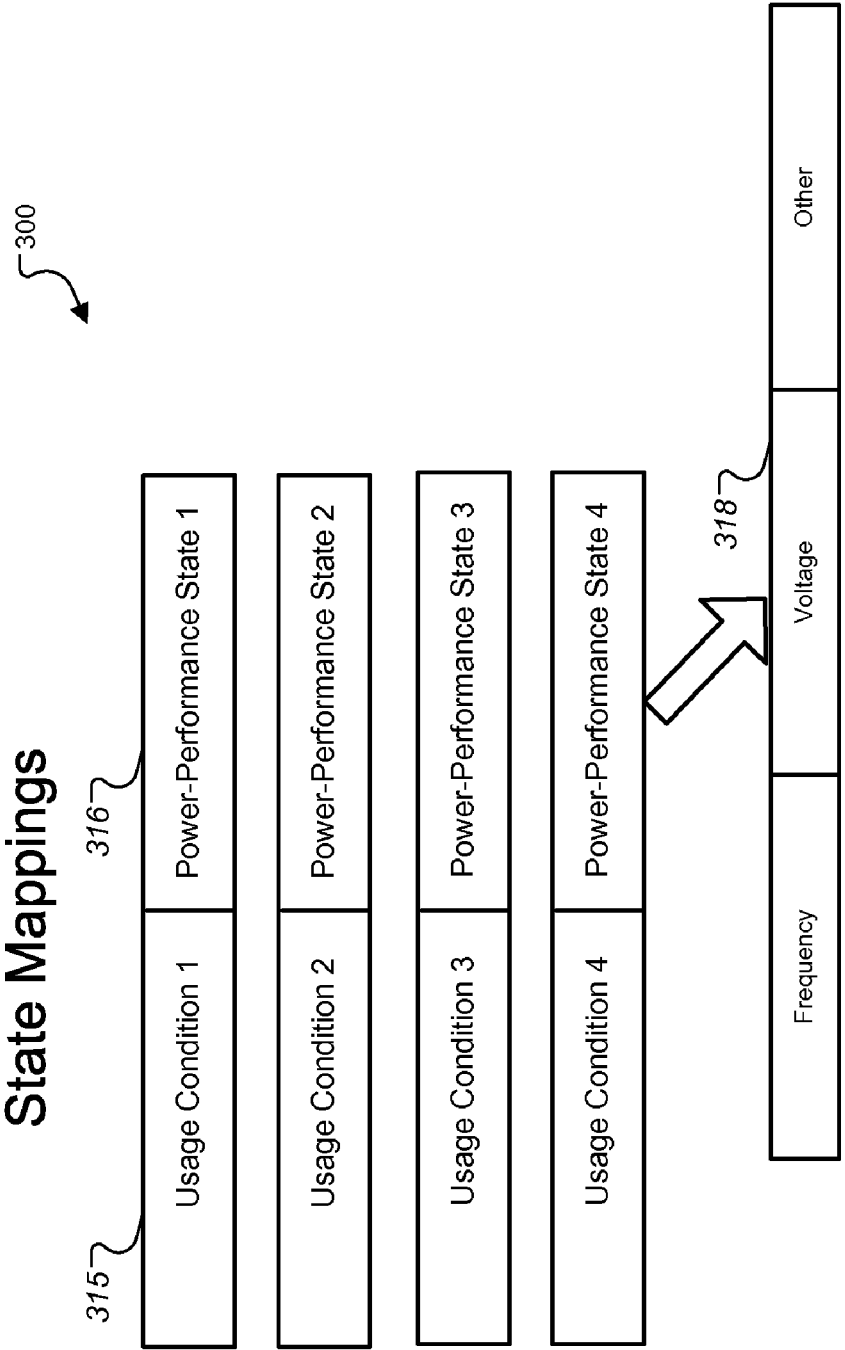
FIG. 4 shows data fields in the power-performance portion of the state mappings.

Shown in FIG. 3, the usage condition data portion of the usage to power-performance state mappings may include a number of data fields. The depiction shows one version having data fields 317 in each usage condition data portion in the set 300. The values shown are merely one preferred example, and do not represent all variations possible within the scope of the invention. FIG. 4 shows data fields in the power-performance state data portion of the state mapping.

Among the data fields shown in FIG. 3, showed no particular order, is an Active Cycles Over Total Cycles metric data field. This field contains a value for the metric reflecting how many processor instruction cycles are actively executing instructions from among the total cycles in a given period. The time interval used as preferably programmable and to the fast-adjust hardware circuitry employed herein. In fact, the duration intervals used to calculate all metrics herein is preferably programmable. Shown next is a completed Instructions Per Cycle metric data field (IPC). Another field shows the current power-performance state, which is relevant and deciding what a target state should be under particular usage conditions. Next is a Cycle Length data field that reflects the number of cycles used in calculating Instructions Per Cycle (IPC) metric.

Also shown among the usage condition metric data fields is a Temperature data field, which may reflect the core operating temperature. This may be measured from analog value produced by a temperature sensing transducer arranged in the semiconductor device. Also shown as a Frequency data field reflecting the current frequency at which the processor core operates. That show is a Voltage data field reflecting current voltage at which the processor core operates.

A System Performance Setting data field reflects a value determined from our performance settings provided by more traditional power performance schemes such as software or firmware power performance controller. As previously explained, the fast-adjust circuitry described herein is compatible with existing or future software solutions, and acts to supplement those solutions with finer-grained control (over faster time periods that is possible with software and firmware solutions). At the time of this filing, such faster time periods provide ability to change power-performance states in response to processor workload changes on the order of 10 micro-seconds (μs), but this is not limiting and is, of course, relative to the processor speed and instruction execution speed. Also appearing is an Application Performance Setting data field, which contains a value that may be set by a presently executing application, either as provided by software configuration driver for the present circuitry, or provided to a software based solution use in concert with the present solution. The same is true for next data field, the User Performance Setting data field. That is, this field may be preset by the user employing a complementary software-based system, or maybe set directly using a software programming interface or the circuitry of the present invention during configuration of the fast-adjust circuitry herein. Any interaction of complimentary software or firmware with the fast-adjust circuitry control loop is done through setting the configuration of the control loop, separate from the operation of the control loop. In some embodiments, the software configuration driver for the circuitry herein also includes software modules implementing a software-based (long interval) power-performance state control system in addition to the fast-adjust system described herein. In other embodiments, the configuration driver for the fast-adjust circuitry herein may read the relevant values (such as the System Performance Setting, the Application Performance Setting, or the User Performance Setting) from system memory, from the system database, from system configuration files. In other embodiments, where such settings are provided as register values in the processor core, one more of these values may be fed in hardware directly to be fast-adjust hardware.

While several relevant metrics are shown to describe system usage, these are not limiting and any suitable metric value may be employed. Appropriate metric values are those that can be calculated or counted/measured by digital logic circuitry, rather than requiring software or firmware. However the system may use any metric, no matter how it is obtained, that may be useful in the power performance state mapping system herein.

FIG. 4 shows data fields in the power-performance portion of the state mappings. As depicted, the mapping set 300 is the same set as shown in FIG. 3, including usage conditions 315 which are mapped to desired associated power-performance states 316. FIG. 4 shows more detail of the power performance portion 318 of the state mappings.

First shown is a Frequency data field, which contains a value setting the operating frequency of the processor core in the desired power performance state. This field is typically the most important field in determining the power-performance state. The values in a frequency field are used to control the processor clock. Preferably, the values range from high burst values, which are used to set short bursts of very fast processor clock activity, to low sleep values which may turn the clock off or set the processor into a very slow state for low to the periods. The range of possible frequencies as preferably divided into many increments, for fine-grained control of the processor clock speed. Next shown in FIG. 4 is the Voltage data field, which contains a value corresponding to the desired processor core voltage supply level in the power-performance state. Another data field is shown labeled as Other, to represent that other values may be needed and employed to define processor power-performance state. Some embodiments may use relative values, that is, specifying that the frequency and voltage are to be increased or decreased a certain amount. Other embodiments may use absolute values, that is, specifying that the frequency and voltage are to be set to a specific chosen value.

FIG. 5 shows two data structures for two different sets of power-performance state mappings. As discussed above, these data sets may appear as a data structure employed by the configuration software in some embodiments of the present invention, and subsequently they appear as register data values or other digital logic circuit memory values after being programmed into the selection circuitry used in various embodiments of the invention. In preferred embodiments, these entries are programmed into the digital logic power-performance state selection hardware and thereby control what power-performance states are selected during what usage conditions.

Some embodiments employ two or more data sets, such as the depicted Set A and Set B. In such cases the software configuration driver used to program the fast-change hardware herein may selectively update the fast-change circuit program to change the power-performance state data used from one set to the other. For example, a data set to be provided for each system performance setting used in a software-based solution (longer-term solution) working together with hardware-based solutions herein. Alternately, more data sets maybe provide that certain combinations of system performance settings and application performance settings or user performance settings.

Preferably, any software-based complimentary solution is designed to configure the fast-adjust control loop herein, separate from the operation of the control loop, and is developed with and integrated with the hardware configuration driver for the fast-change circuits herein. Whether integrated or not, the configuration driver preferably detect system performance settings, application performance settings, and user performance settings from the system memory, operating system database, or configuration files. By doing this, the configuration driver can automatically update the fast-change circuit configuration. One preferred embodiment of the invention is a method that includes automatically detecting a state change of a software-based power performance system, and in response reprogramming the fast-change circuit to a new set of power-performance state mappings chosen to more efficiently implement the new system power state.

Figure 6:
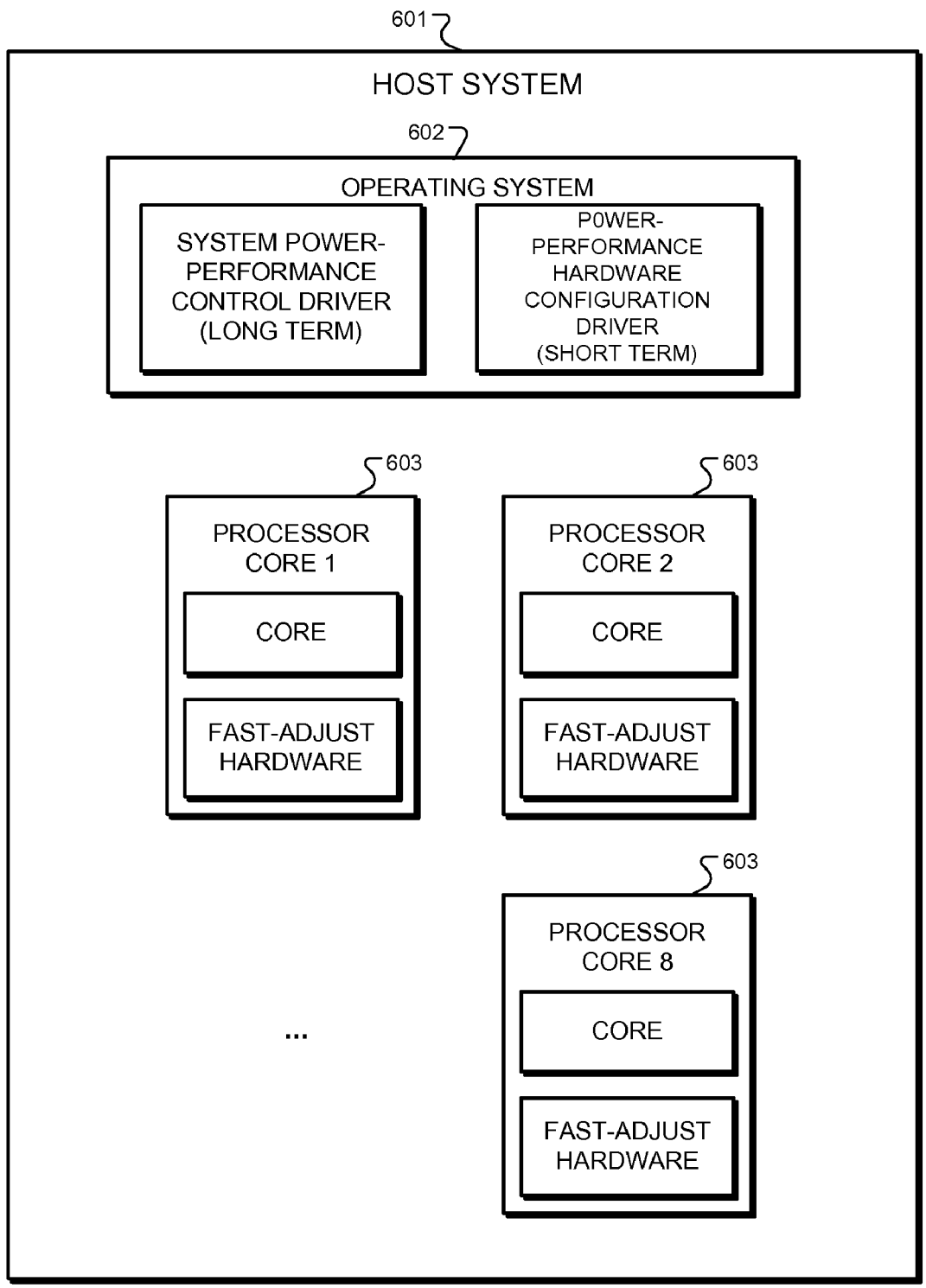
FIG. 6 shows a software and hardware block diagram of a computer system according to one embodiment.

FIG. 6 shows a software and hardware block diagram of a computer system according to one embodiment. As those of ordinary skill in the art will recognize, many, elements are of course left out of the diagram to avoid needless complexity. Circuits according the invention may be used in any suitable computer processor, such as for example PC processors, server processor, embedded or mobile processors, and including multiple-core processors which are becoming common in the art in all application areas. Further, the techniques taught herein may be employed with any combination of general-purpose processor cores, or dedicated cores such as DSP cores and floating point coprocessor cores.

The depicted system 601 includes an operating system 602 having installed therein a system power performance control driver and a hardware power-performance control driver. The system power-performance control driver typically includes traditional performance control software that provides power and performance control over longer intervals of time than that done with the fast-change circuits herein. The hardware power-performance control driver provides capability to program the fast adjust hardware included in the depicted processor cores.

Depicted are multiple processor cores 603, each including both a hardware core and fast-adjust circuitry operatively coupled to the core. One preferred embodiment is an eight-core processor designed for high-performance servers. These processors provided in a package with two integrated circuit devices mounted to an interposer, each device having eight processor cores. The scope of the invention in various embodiments may, of course, include the entire host system including software and hardware.

Figure 7:
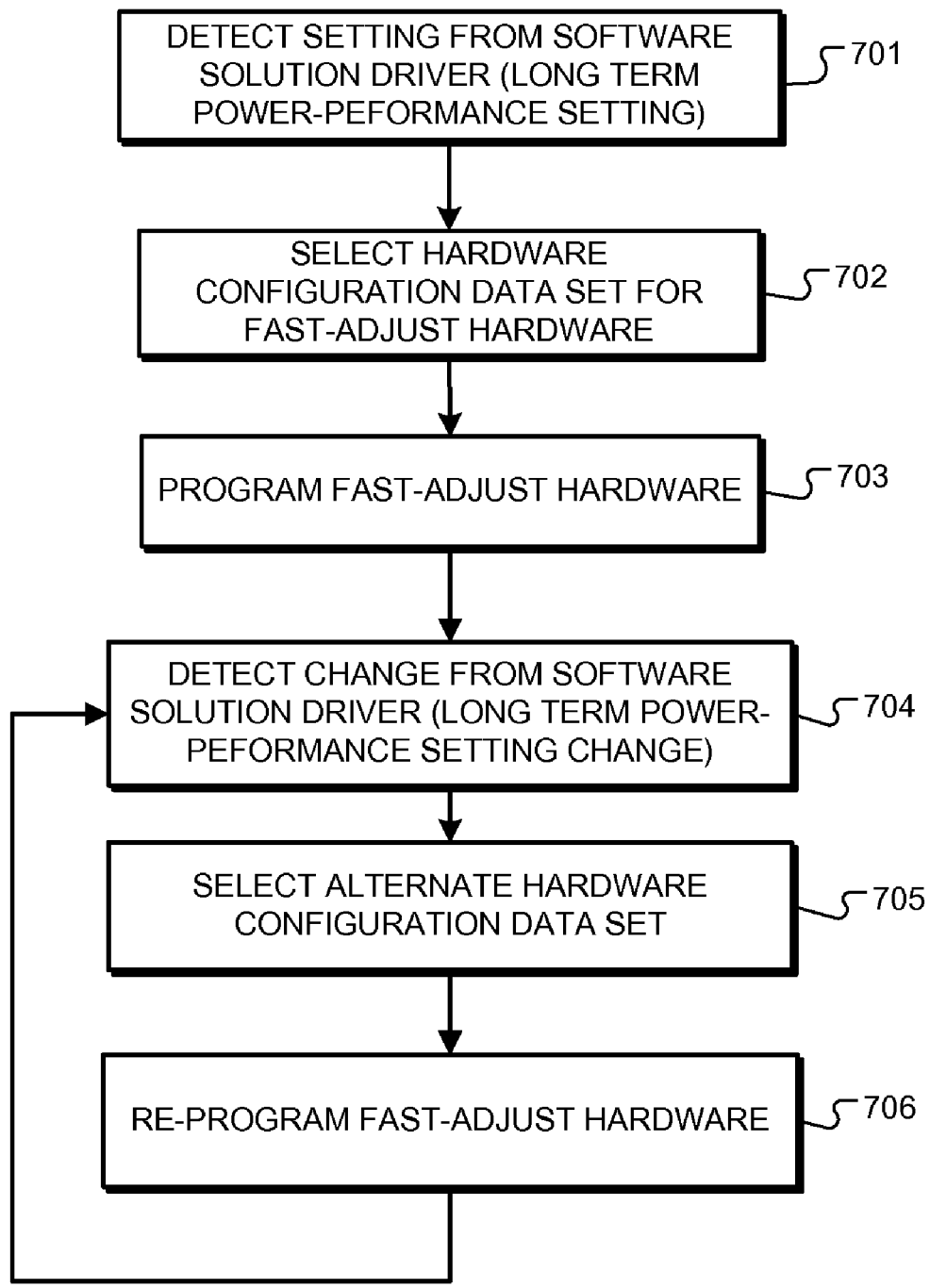
FIG. 7 shows a flow chart of a method of configuring fast-adjust hardware according to one embodiment.

FIG. 7 shows a flow chart of a method of configuring fast-adjust hardware according to one embodiment. The depicted method starts with process block 701 where the power-performance configuration driver (FIG. 6) detects the long-term system setting from the system power-performance control software. In the case where these two software modules are compatible or integrated, this step consists of receiving or accessing the system setting, rather than detecting it. Based on the setting, the driver next selects a configuration data set with which to configure the fast-adjust hardware at block 702. After selecting the data set, the driver programs the fast-adjust hardware at block 703. The programming step may be accomplished in various ways such as, for example, writing specific control values to special-purpose registers included in each processor core, or interfacing with processor firmware to configure the digital logic circuitry in the fast-adjust hardware.

After programming at process block 703, the fast-adjust hardware is operational and runs automatically and independently from intervention with the configuration driver. At this point, the driver's role is to update the configuration settings of the fast-adjust hardware when needed. This is done by detecting changes from software solution driver, which may change a desired long-term power-performance setting for the system processor. Such change not shown between block 703, but may occur before each iteration of block 704. The detection at block 704 may also include, of course, accepting user or application input to change the power-performance state. As explained previously, the software solution driver maybe integrated with the hardware configuration driver in some embodiments, and configured to provide input to the hardware configuration driver to interact with the fast-adjust circuitry herein outside of the fast-adjust closed control loop, by configuring the fast-adjust circuitry. The software solution driver may also set register values or otherwise control the processor (including its clocking hardware and point-of-load voltage supply) hardware to implement the power-performance decisions it has made in software.

In response to detecting a change in the long-term system power-performance settings, the power-performance configuration driver will select an alternate hardware configuration data set, if one is required, at block 705. Next, at block 706, the power-performance configuration driver will reprogram the fast-adjust hardware with the selected data set. For example, suppose in block 701 that the system is a notebook PC that was booted with the AC power plugged in, and was therefore, in this example, initiated in to a high performance state from the system software solution driver. The fast-adjust hardware configuration driver would program appropriate selected data set, and this example data Set A in FIG. 5, into the fast adjust hardware. Now suppose in this scenario at PC were unplugged and the system power-performance software solution driver changed its power-performance setting to a lower power battery extended mode. The process at block 704 would detects a change in what select appropriate power-performance state mapping data set, for example Set B in FIG. 5, and program the hardware circuitry accordingly. So while the system software solution is able to make long-term adjustments, the hardware circuitry solution provided herein, being embedded in the semiconductor device with processor core, is able to complement system software solution by making short-term adjustments, thus improving energy efficiency.

Figure 8:
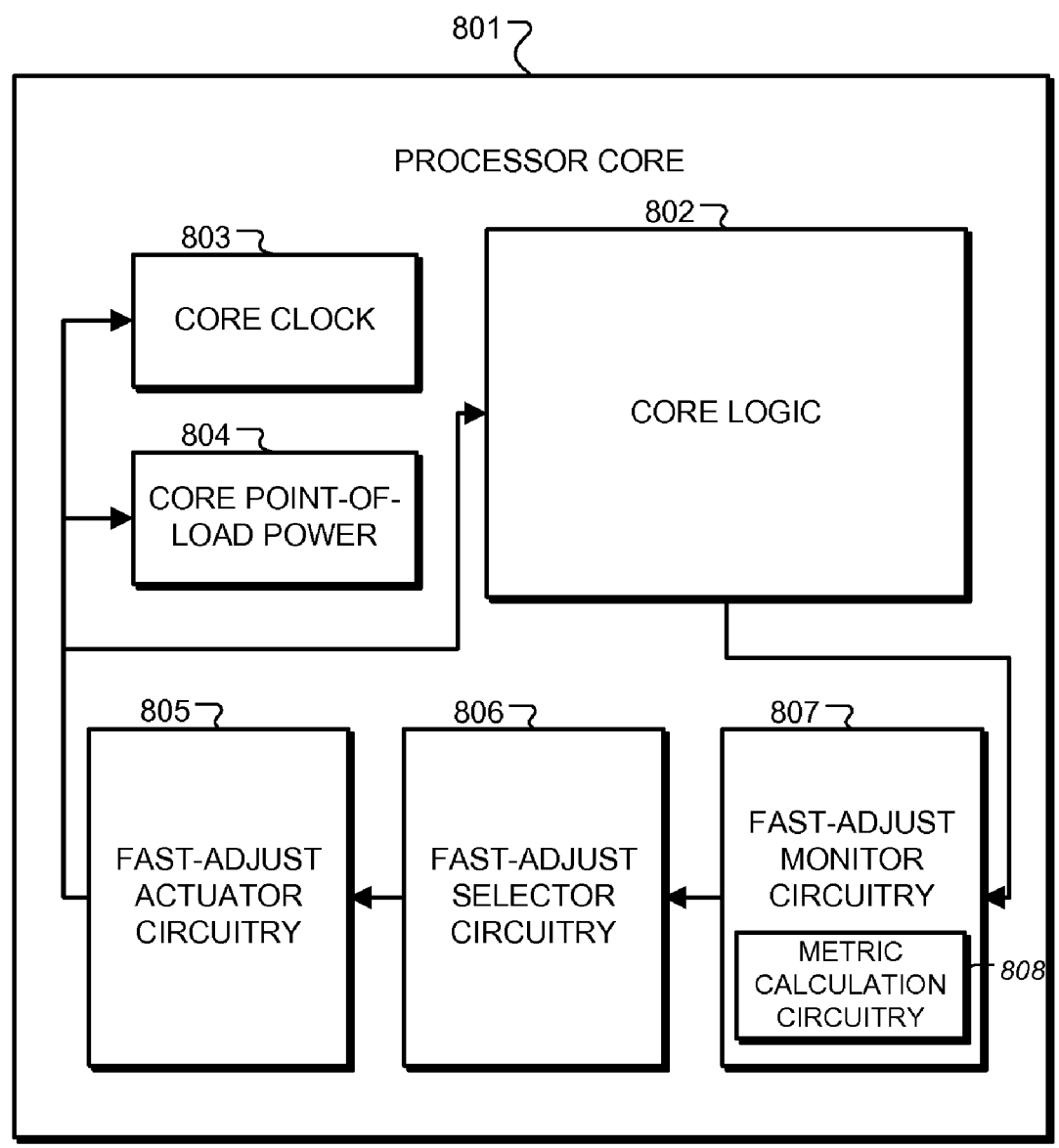
FIG. 8 is a hardware block diagram of a semiconductor device processor core according to one embodiment.

FIG. 8 is a hardware block diagram of a semiconductor device processor core according to one embodiment. More than one such core may exist on a single semiconductor device. The core 801 in this embodiment includes processor core logic 802, supplied with a clock signal from core clock 803, and supplied with a voltage from core point-of-load power supply 804. Showing operatively coupled to core logic 802 is fast-adjust monitor circuitry 807. The circuitry is preferably physically distributed within the layout of the core logic in order to accurately count and measure events occurring in the core. Based on the observed events, the fast-adjust monitor circuitry calculates certain metric values and its metric calculation circuitry 808. The circuitry is preferably embodied as appropriate digital logic to count, add, divide, and scale observed core logic values as needed.

The calculated metric values are passed to fast-adjust selector circuitry 806, which is operably coupled to circuitry 807. Selector circuitry 806 uses digital logic such as programmable multiplexers to select a desired power-performance state based on the current values of the metrics provided from circuitry 807. The desired power performance state value is transmitted to or accessed by fast-adjust actuator circuitry 805. The circuitry is operably coupled to the core clock, the core point-of-load power supply, and the core logic in such manner as to effect fast changes in power-performance operating state. The depicted circuitry presents a hardware decision loop that operates, in preferred embodiments, without intervention from software or firmware in the digital logic decisions in operation of circuits 807, 806, and 805. Further, the depicted circuitry is co-located with the core circuitry, meaning it is disposed integrated with and proximate to the semiconductor region containing the core circuitry, and not located in a different processor core from the core being measured and controlled.

For flexibility, it is desirable that at least the following elements of the system be programmable by the configuration logic: The duration of interval(s) for accumulating counts for usage metric(s); Usage threshold(s) for triggering actuations or usage-to-power-performance-state mappings; Size of actuation steps (e.g. extent of increase or decrease in frequency/voltage for change in usage metric relative to threshold or as indicated by mapping tables); and power-performance data mapping sets (in designs where power-performance data mappings sets provide absolute, non-relative values to describe the desired power-performance state). While programming hardware is not specifically shown, programmable registers or other suitable means may be used.

As used herein, the terms "comprising," "including," "carrying," "having," "containing," "involving," and the like are to be understood to be open-ended, that is, to mean including but not limited to.

Any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. An integrated circuit device comprising:
   a processor core for executing a stream of program instructions;
   core monitoring circuitry for calculating one or more digital metric output values indicating selected ongoing usage-level metrics of the processor core;
   core performance-state selection circuitry for selecting a desired performance state from among at least two possible desired performance states based, at least in part, on one or more digital metric output values calculated by the core monitoring circuitry, and for outputting a desired performance state output value, the core performance-state selection circuitry operable independent of the stream of program instructions; and
   actuator circuitry for receiving the desired performance state value from the core performance-state selection circuitry and, in response, adjusting a core power-performance state between at least a first and second level based on the performance state output value the actuator circuitry operable independent of the stream of program instructions.

2. The integrated circuit device of claim 1, further comprising usage threshold programming circuitry for receiving desired usage threshold level indicators from software and storing the desired usage threshold levels for controlling the performance-state selection circuitry.

3. The integrated circuit device of claim 1, further comprising actuation step programming circuitry for receiving desired actuation step size indicators from software and storing the desired actuation step size indicators for controlling the performance state selection circuitry.

4. The integrated circuit device of claim 1, further comprising metric duration programming circuitry for receiving desired core-usage metric duration indicators from software and changing a duration over which the core monitoring circuitry calculates the one or more digital output values.

5. The integrated circuit device of claim 1, further comprising performance state mapping circuitry for mapping the selected ongoing usage-level metrics of the processor core to selected respective ones of a group of performance state indicators stored in the integrated circuit device.

6. The integrated circuit device of claim 1, further comprising power control firmware adapted for executing on the integrated circuit device, the power control firmware for monitoring additional ongoing usage-level metrics of the processor core, calculated over a longer time period than the ongoing usage-level metrics, and for further controlling the actuator circuitry.

7. The integrated circuit device of claim 6, in which the power control firmware is also for receiving application-level input from applications executed on the integrated circuit device.

8. An integrated circuit device comprising:
   a processor core for executing a stream of program instructions;
   core monitoring circuitry operatively coupled to the processor core, and operable to provide one or more first digital output values indicating first selected ongoing usage-level metrics of the processor core, the selection circuitry operable independent of the stream of program instructions;
   core usage-level metric digital circuitry operable to receive at least one of the one or more first digital output values, and operable to calculate one or more second digital output values indicating second selected ongoing usage-level metrics of the processor core, the second usage-level metrics being based, at least partially, on the first usage-level metrics, the core usage-level metric digital circuitry operable independent of the stream of program instructions;
   performance-state selection digital circuitry operably coupled to the core usage-level metric digital circuitry and operable to select a desired performance state from among at least two desired possible desired performance states, the performance-state selection circuitry further operable to output a desired performance state output value, the performance-state selection digital circuitry operable independent of the stream of program instructions; and
   actuator circuitry operably coupled to the processor core, and operable to adjust a core power-performance state between at least a first and second level based on the performance state output value, the actuator circuitry operable independent of the stream of program instructions.

9. The integrated circuit device of claim 8, in which the performance-state selection digital circuitry is operable to compare a core usage metric value to a threshold metric value, and in response determining the core usage metric value has a first relationship to the threshold metric value, produce a desired performance state output value associated with a lowered activity power performance state.

10. The integrated circuit device of claim 8, in which the second selected ongoing usage-level metrics of the processor core include a metric indicative of a number of active cycles in a given number of total cycles.

11. The integrated circuit device of claim 8, in which the second selected ongoing usage-level metrics of the processor core include a metric indicative of a number of completed instructions in a given interval.

12. The integrated circuit device of claim 8, in which the device is configured to be programmed with a power-performance configuration driver to adjust a set of power-performance mappings that guide selections made by the performance-state selection digital circuitry.

13. The integrated circuit of claim 12, in which the power-performance configuration driver is further operable to detect a change in a long-term system power-performance setting, and in response, to re-configure the performance-state selection circuitry with a selected set of power-performance mappings.

14. The integrated circuit device of claim 8, in which the actuator circuitry is further operable to adjust the core power-performance state within 10 microseconds after a usage sequence in which the processor core achieves an ongoing usage workload usage level corresponding to an adjustment.

15. A method of improving the power efficiency of a processor, the method comprising:
monitoring a processor core to determine one or more selected ongoing usage-level metrics of the processor core;
detecting a change in at least one of the one or more selected ongoing usage level metrics of the processor core;
in response to detecting the change, selecting a desired next core performance state using core performance-state selection circuitry, said core performance-state selection circuitry operating without receiving any data or control input from system software or firmware between detecting the change and selecting the desired next core performance state, selecting the desired next core performance state being performed independent of a stream of program instructions executing on the processor core; and
in response to selecting the desired next core performance state, changing a performance state of the processor core using core performance actuator circuitry without receiving any data or control input from system software or firmware between selecting the desired next core performance state and changing a performance state of the processor core, changing the performance state of the processor core being performed independent of the stream of program instructions.

16. The method of claim 15, in which selecting a desired next core performance state further comprises accessing a selected one of three or more stored core performance state values through digital logic circuitry distinct from core processor processing circuitry.

17. The method of claim 16, further comprising, after selecting the core performance state, storing a value indicating the selected core performance state using digital logic circuitry distinct from core processor processing circuitry.

18. The method of claim 17, further comprising, with the core performance-state selection circuitry, selecting a second desired next core performance state based at least partially on the stored value indicating the selected core performance state.

19. The method of claim 15, in which adjusting the core power performance using the actuator circuitry is accomplished within 10 microseconds after detecting the change in the at least one of the one or more selected ongoing usage level metrics.

20. The method of claim 15, in which changing the performance state of the processor core further includes changing the operating voltage of the processor core.

* * * * *